US012027963B2

United States Patent
Avestruz et al.

(10) Patent No.: US 12,027,963 B2
(45) Date of Patent: Jul. 2, 2024

(54) POWER PROCESSING AND ENERGY STORAGE

(71) Applicant: The Regents of the University of Michigan, Ann Arbor, MI (US)

(72) Inventors: Al-Thaddeus Avestruz, Ann Arbor, MI (US); Xiaofan Cui, Ann Arbor, MI (US); Jason Siegel, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 362 days.

(21) Appl. No.: 17/497,680

(22) Filed: Oct. 8, 2021

(65) Prior Publication Data

US 2022/0115940 A1 Apr. 14, 2022

Related U.S. Application Data

(60) Provisional application No. 63/090,199, filed on Oct. 10, 2020.

(51) Int. Cl.
*H02M 1/08* (2006.01)
*G06N 5/01* (2023.01)
*H02M 1/00* (2006.01)

(52) U.S. Cl.
CPC .............. *H02M 1/007* (2021.05); *G06N 5/01* (2023.01); *H02M 1/08* (2013.01)

(58) Field of Classification Search
CPC .. G06F 13/385; G06F 13/4282; H03M 1/662; H04B 1/48
See application file for complete search history.

(56) References Cited

U.S. PATENT DOCUMENTS

| | | | |
|---|---|---|---|
| 10,457,159 B1 * | 10/2019 | Castelaz | H02M 3/1582 |
| 2011/0144822 A1 * | 6/2011 | Choi | H02J 3/32 |
| | | | 700/297 |
| 2018/0102646 A1 * | 4/2018 | Apte | H02J 1/14 |

OTHER PUBLICATIONS

Zhang et al., A hierarchical active balancing architecture for lithium-ion batteries; IEEE Transactions on Power Electronics, vol. 32, No. 4, 2017, 25 pp (Year: 2017).*
120W Industrial Quarter Brick Converters, GQA120 Series; TDK Lambda; Jul. 2020; 3 pp.
12V 12AH Lithium Ion Battery; https://web.archive.org/web/20170701165223/https://www.lithiumion-batteries.com/products/12v-12ah-lithium-ion-battery/; CHARGEX; Jul. 2017; 6 pp.
12V 4 Bank 10A Lithium Ion Battery Charger; https://web.archive.org/web/20200929081417/https://www.lithiumion-batteries.com/products/lithium-ion-chargers/12v-lithium-ion-battery-chargers/four-bank-10a-lithium-ion-battery-charger.php; CHARGEX; Sep. 2020; 4 pp.

(Continued)

*Primary Examiner* — Patrick C Chen
(74) *Attorney, Agent, or Firm* — Lempia Summerfield Katz LLC

(57) ABSTRACT

A power conversion device may perform model-referenced power processing for multiple heterogenous power nodes. The power conversion device includes interconnects that couple power nodes to power converters. The power converters may include a sparse set in which the number of power converters is dependent on the model of the power source heterogeneity. The sparse set performs power processing on the power from the power node to facilitate provision of a target power at a port of the power conversion device.

20 Claims, 10 Drawing Sheets

(56) References Cited

OTHER PUBLICATIONS 250W, 9 to 40V Input Non-Isolated Step-Down DC-DC Buck Converter; i6A Series; TDK Lambda; Aug. 2021; 6 pp.

B. Borlaug, S. Salisbury, M. Gerdes, and M. Muratori, Levelized Cost of Charging Electric Vehicles in the United States; Joule, vol. 4, No. 7, pp. 1470-1485, 2020.

C. C. Hua and Y. H. Fang, A charge equalizer with a combination of APWM and PFM control based on modified half-bridge converter; 2015 18th International Conference on Electrical Machines and Systems, ICEMS 2015, pp. 2147-2150, 2016.

C. Pastor-Fernandez, T. Bruen, W. Widanage, M. Gama-Valdez, and J. Marco, A study of cell-to-cell interactions and degradation in parallel strings: Implications for the battery management system; Journal of Power Sources, vol. 329, pp. 574-585, Oct. 2016.

C.-S. Moo, K. S. Ng, and Y.-C. Hsieh, Parallel operation of battery power modules; IEEE Transactions on Energy Conversion, vol. 23, No. 2, pp. 701-707, 2008.

E. Candan, D. Heeger, P. S. Shenoy, and R. C. Pilawa-Podgurski, A series-stacked power delivery architecture with hot-swapping for high-efficiency data centers; 2015 IEEE Energy Conversion Congress and Exposition, ECCE 2015, pp. 571-578.

E. Hossain, D. Murtaugh, J. Mody, H. M. R. Faruque, M. S. H. Sunny, and N. Mohammad, A comprehensive review on second-life batteries: Current state, manufacturing considerations, applications, impacts, barriers & potential solutions, business strategies, and policies; IEEE Access, vol. 7, pp. 73215-73252, 2019.

F. Boico, B. Lehman, and K. Shujaee, Solar battery chargers for NiMH batteries; IEEE 36th Conference on Power Electronics Specialists, 2005 IEEE, pp. 146-152.

G. Rancilio, A. Lucas, E. Kotsakis, G. Fulli, M. Merlo, M. Delfanti, and M. Masera, Modeling a large-scale battery energy storage system for power grid application analysis; Energies, vol. 12, p. 3312, 2019.

H. Engel, P. Hertzke, and G. Siccardo, Second-life EV batteries: The newest value pool in energy storage; McKinsey&smp;Company; Tech. Tep., 2019, 5 pp.

H. Zhou, J. Zhao, and Y. Han, PV balancers: Concept, architectures, and realization; IEEE Transactions on Power Electronics, vol. 30, No. 7, pp. 3479-3487, Jul. 2015.

J. Biela, M. Schweizer, S. Waffler, and J. W. Kolar, SiC versus Si-Evaluation of potentials for performance Improvement of inverter and DC-DC converter systems by SiC power semiconductors; IEEE Transactions on Industrial Electronics, vol. 58, pp. 2872-2882, Jul. 2011.

J. Neubauer, K. Smith, E. Wood, and A. Pesaran, Identifying and Overcoming Critical Barriers to Widespread Second Use of PEV Batteries; National Renewable Energy Laboratory (NREL), Feb. 2015, 93 pp.

J. Wang, D. Wu, W. Zhao, S. Shi, B. Upadhaya, and Y. Shi, Queueing Theory-Based Optimal Decision-Making Model of Battery Energy Storage-Assisted Fast Charging Station Participating in Emergency Demand Response; iSPEC 2020—Proceedings: IEEE Sustainable Power and Energy Conference; 2020, pp. 2110-2115.

K. J. Arrow, Decision Theory and Operations Research; Operations Research, vol. 5, pp. 765-774, Dec. 1957.

K. Mongird, V. Fotedar, V. Viswanathan, V. Koritarov, P. Balducci, B. Hadjerioua, and J. Alam, Energy storage technology and cost characterization report; Pacific Northwest National Laboratory, Jul. 2019, pp. 1-120.

C. Casals, B. Amante Garcia, and C. Canal; Second life batteries lifespan: Rest of useful life and environmental analysis; Journal of Environmental Management, vol. 232, pp. 354-363, 2019.

L. Yang and H. Ribberink, Investigation of the potential to improve DC fast charging station economics by integrating photovoltaic power generation and/or local battery energy storage system; Energy, vol. 167, 2019, 48 pp.

L. Yao, W. H. Lim, and T. S. Tsai, A Real-Time Charging Scheme for Demand Response in Electric Vehicle Parking Station; IEEE Transactions on Smart Grid, vol. 8, No. 1, pp. 52-62, Jan. 2017.

LiNiMnCo 26650 Battery Pack: 14.4V 20Ah (288Wh, 30A rate, 4Rx4C); https://web.archive.org/web/20200926173806/ https://www.batteryspace.com/LiNiMnCo-26650-Battery-Pack-14.4V-20Ah-288Wh-30A-rate.aspx; AA Portable Power Corp., Sep. 2020; 2 pp.

LiNiMnCo 26650 Battery: 14.4V 10Ah (144Wh, 10A rate) in Aluminum-Box; https://web.archive.org/web/20180627185637/http://www.batteryspace.com/linimnco-26650-battery-14-4v-10ah-144wh-10a-rate-in-aluminum- box.aspx; AA Portable Power Corp., Jun. 2018; 2 pp.

M. Al-Amin, A. Barai, T. Ashwin, and J. Marco, An insight to the degradation behaviour of the parallel connected lithium-ion battery cells; Energies, vol. 14, No. 16, p. 4716, Aug. 2021.

M. D'Arpino and M. Cancian, Design of a grid-friendly DC fast charge station with second life batteries; SAE Technical Papers, Apr. 2019, SAE International, 1 pp—abstract only.

M. Evzelman, M. M. Ur Rehman, K. Hathaway, R. Zane, D. Costinett, and D. Maksimovic, Active Balancing System for Electric Vehicles With Incorporated Low-Voltage Bus; IEEE Transactions on Power Electronics, vol. 31, No. 11, 2016, 8 pp.

M. Faisal, M. A. Hannan, P. J. Ker, A. Hussain, M. B. Mansor, and F. Blaabjerg, Review of energy storage system technologies in microgrid applications: Issues and challenges; IEEE Access, vol. 6, pp. 35143-35164, 2018.

M. J. Brand, M. H. Hofmann, M. Steinhardt, S. F. Schuster, and A. Jossen, Current distribution within parallel-connected battery cells; Journal of Power Sources, vol. 334, pp. 202-212, Dec. 2016.

N. Mukherjee and D. Strickland, Control of second-life hybrid battery energy storage system based on modular boost-multilevel buck converter; IEEE Transactions on Industrial Electronics, vol. 62, 2015, 12 pp.

NKL, Guidelines for the realisation of charging plazas; The Netherlands Knowledge Platform for Public Charging Infrastructure (NKL), Tech. Rep., 2019, 16 pp.

P. B. L. Neto, O. R. Saavedra, and L. A. De Souza Ribeiro, A Dual-Battery Storage Bank Configuration for Isolated Microgrids Based on Renewable Sources; IEEE Transactions on Sustainable Energy, vol. 9, 2018, 10 pp.

P. S. Shenoy, K. A. Kim, B. B. Johnson and P. T. Krein; Differential Power Processing for Increased Energy Production and Reliability of Photovoltaic Systems; IEEE Transactions on Power Electronics, vol. 28, No. 6, pp. 2968-2979, Jun. 2013.

P.-H. La and S.-J. Choi, Synthesis of balancing topologies for parallel-connected battery cells by principle of duality; 2019 10th International Conference on Power Electronics and ECCE Asia (ICPE 2019—ECCE Asia). IEEE, May 2019, 5 pp.

PSL-BTC-12120 Lithium Bluetooth Series; https://web.archive.org/web/20190416121754/https://www.power-sonic.com/product/psl-btc-12120/; Power Sonic Corp., Apr. 2019; 6 pp.

Q. Yang, S. Sun, S. Deng, Q. Zhao, and M. Zhou, Optimal Sizing of PEV Fast Charging Stations with Markovian Demand Characterization; IEEE Transactions on Smart Grid, vol. 10, No. 4, 2019, 11 pp.

S. Deb, K. Tammi, K. Kalita, and P. Mahanta, Impact of electric vehicle charging station load on distribution network; Energies, vol. 11, No. 1, pp. 1-25, 2018.

S. J. Tong, A. Same, M. A. Kootstra, and J. W. Park, Off-grid photovoltaic vehicle charge using second life lithium batteries: An experimental and numerical investigation; Applied Energy, vol. 104, pp. 740-750, Apr. 2013.

S. Leonori, G. Rizzoni, F. M. Frattale Mascioli, and A. Rizzi, Intelligent energy flow management of a nanogrid fast charging station equipped with second life batteries; International Journal of Electrical Power and Energy Systems, vol. 127, 2021, p. 106602.

S. Saravanan, P. Pandiyan, T. Chinnadurai, T. Ramji, N. Prabaharan, R. S. Kumar, and P. L. Pugalhanthi, Reconfigurable battery management system for microgrid application; Microgrid Technologies, pp. 145-176, Mar. 2021.

S. Saxena, C. Hendricks, and M. Pecht, Cycle life testing and modeling of graphite/LiCoO2 cells under different state of charge ranges; Journal of Power Sources, vol. 327, pp. 394-400, 2016.

Smart Charger (6.0A) for 14.8V Li-ion/Polymer Rechargeable Battery Pack; https://web.archive.org/web/20180211062950/http://

(56) References Cited

OTHER PUBLICATIONS www.batteryspace.com/Smart-Charger-6.0A-for-14.8V-Li-ion/Polymer-Rechargeable-Battery-Pack.aspx; AA Portable Power Corp., Feb. 2018; 2 pp.

T. Bruen and J. Marco, Modelling and experimental evaluation of parallel connected lithium ion cells for an electric vehicle battery system; Journal of Power Sources, vol. 310, pp. 91-101, Apr. 2016.

T. S. Bryden, G. Hilton, B. Dimitrov, C. Ponce De Leon, and A. Cruden, Rating a Stationary Energy Storage System Within a Fast Electric Vehicle Charging Station Considering User Waiting Times; IEEE Transactions on Transportation Electrification, vol. 5, No. 4, 2019, 11 pp.

X. Cui, A. Ramyar, J. Siegel, P. Mohtat, A. Stefanopoulou, and A.-T. Avestruz, Grid Interfaces to Electric Vehicle Chargers Using Statistically-Structured Power Conversion for Second-Use Batteries as Energy Buffering; https://arxiv.org/abs/2104.14976v1, 2021, 11 pp.

X. Cui, A. Ramyar, P. Mohtat, V. Contreras, J. Siegel, A. Stefanopoulou, and A.-T. Avestruz, Optimizing Partial Power Processing for Second-Use Battery Energy Storage Systems; https://arxiv.org/abs/2106.11749v1; Jun. 2021, 10pp.

X. Gong, R. Xiong, and C. C. Mi, Study of the characteristics of battery packs in electric vehicles with parallel-connected lithium-ion battery cells; 2014 IEEE Applied Power Electronics Conference and Exposition—APEC 2014. IEEE, Mar. 2014, pp. 3218-3224.

Y. Wang and J. S. Thompson, Two-stage admission and scheduling mechanism for electric vehicle charging; IEEE Transactions on Smart Grid, vol. 10, No. 3, 2019, 12 pp.

Y. Xiong, B. Wang, C. C. Chu, and R. Gadh, Vehicle grid integration for demand response with mixture user model and decentralized optimization; Applied Energy, vol. 231, pp. 481-493, 2018.

Z. Zhang, H. Gui, D. J. Gu, Y. Yang, and X. Ren, A hierarchical active balancing architecture for lithium-ion batteries; IEEE Transactions on Power Electronics, vol. 32, No. 4, 2017, 25 pp.

C. Hua and Y. Fang; A Charge Equalizer With a Combination of APWM and PFM Control Based on a Modified Half-Bridge Converter; in IEEE Transactions on Power Electronics, vol. 31, No. 4, pp. 2970-2979, Apr. 2016, doi: 10.1109/TPEL.2015.2453438.

L. Gaines, Q. Dai, J. T. Vaughey, and S. Gillard; Direct recycling R&D at the recell center; Recycling, vol. 6, No. 2, p. 31, 2021.

M. Slattery, J. Dunn, and A. Kendall; Transportation of electric vehicle lithium-ion batteries at end-of-life: A literature review; Resources, Conservation and Recycling, vol. 174, p. 105755, 2021.

S. Freeland; Techniques for the practical application of duality to power circuits; IEEE Transactions on Power Electronics, vol. 7, No. 2, pp. 374-384, 1992.

Severson, K. A et al.; Data-driven prediction of battery cycle life before capacity degradation; Nature Energy, 4(5), pp. 383-391; 2019; https://doi.org/10.1038/s41560-019-0356-8.

\* cited by examiner

POWER PROCESSING AND ENERGY STORAGE

PRIORITY

This application claims the benefit of U.S. provisional application entitled "Power Processing and Energy Storage," filed Oct. 10, 2020, and assigned Ser. No. 63/090,199, the entire disclosure of which is hereby expressly incorporated by reference.

BACKGROUND

Technical Field

The disclosure relates generally to power processing and energy storage.

Brief Description of Related Technology

In recent years, green technologies for power generation and storage have undergone widespread adoption. For example, many gigawatts of solar cells were installed in the US alone last year. In another example, advanced power storage installations exceeded the gigawatt threshold in the US last year. Forecasts and current incentive systems indicate that this trend of increasing installations will continue in the coming years. Accordingly, there is increasing demand for systems for efficiently and cheaply connecting green technology power nodes (e.g., power sinks and/or power sources) to the grid and for efficiently and cheaply adapting their power output for a variety of other applications. Improvements to power adaption technologies will continue to drive industrial demand.

DETAILED DESCRIPTION

Figure 1:
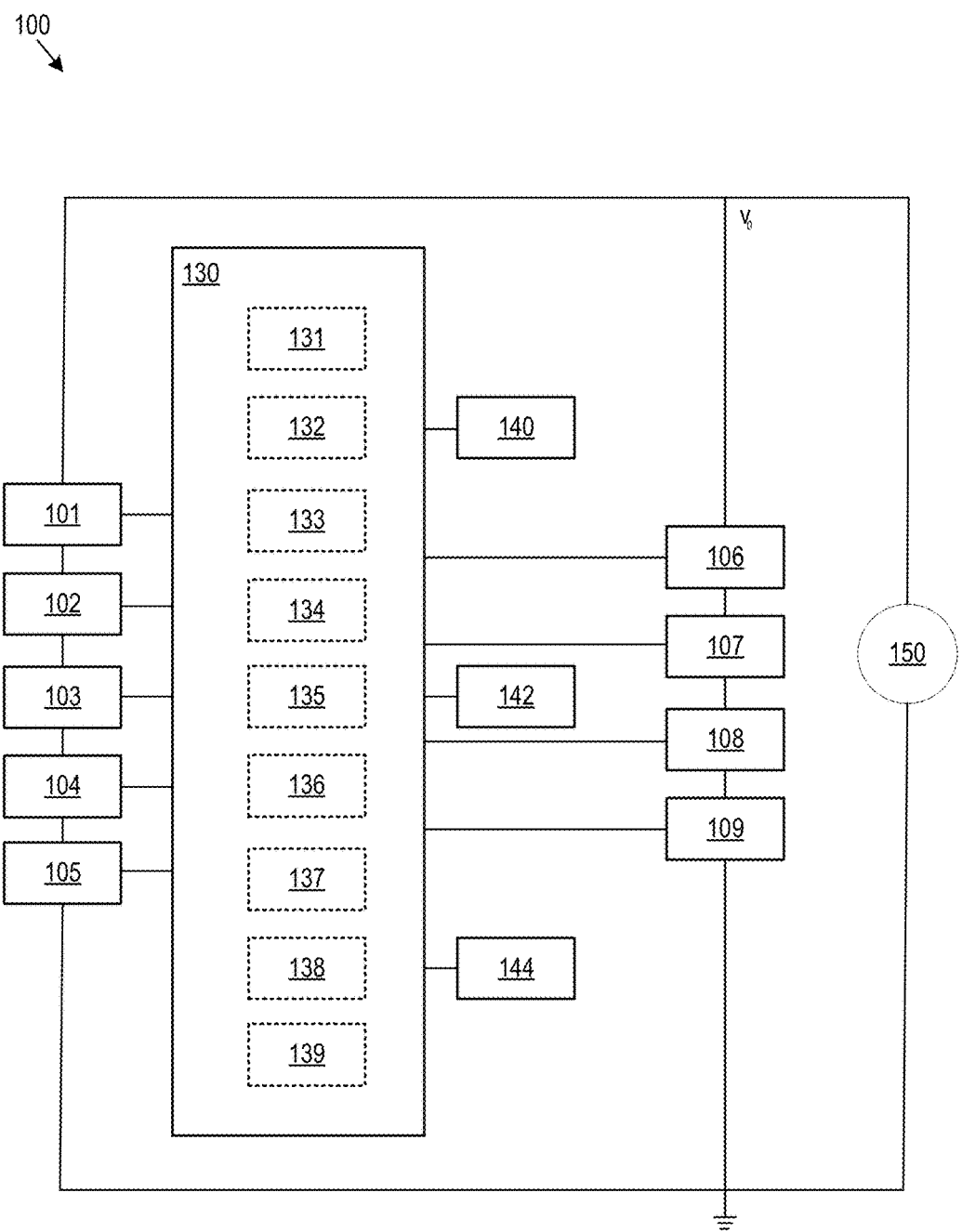
FIG. 1 shows an example power conversion device.

In various contexts, a power source, such as a battery, fuel cell, solar cell, wind turbine, chemical process, or other power source, may output power in a state (e.g., voltage, wattage, current, direct current, alternating current, or other characterization metric) that does not match a target output for a system incorporating the power source. Various contexts may have mismatch between multiple power sinks connected in a unified system (e.g., battery chargers, motors, or other power consuming devices). In other words, a system may have heterogeneity resulting from various power nodes (e.g., power sources and/or power sinks) in the system.

Using batteries as an illustrative example, batteries that may be initially uniform (e.g., at the time of installation) may degrade at different rates, in some cases, including contexts of uniform and/or load balanced usage. Thus, an initially uniform set of batteries may degrade such that the output of the example set differs from the target output of the system. Further, the deviation from the target (or the expected contribution to the target) output by individual batteries in the example set may differ from battery to battery. Diverse degradation may occur at various levels of battery technology, for example different battery packs may degrade differently, further within those packs modules and/or individual cells may have diverse degradation. Batteries may refer to any portion of battery technologies and/or other technologies that behavior as a power storage unit. For example, multiple battery packs, modules, cells, chargers, controllers, power converters, or other battery internals connected via virtually any set of electrical interconnects may, in some cases, be referred to as a single "battery". Further, batteries may in various contexts behave as power sources, power sinks (e.g., while charging), or other power nodes. Solar cell/array power generation may differ as a result of transient and/or spatially variant irradiance profiles, cell degradation, cell obfuscation (e.g., via dust or other detritus), or other non-uniform interference with power generation.

As an illustrative scenario, second use of retired electric vehicle (EV) battery packs (e.g., as residential power backup or other power backup) may require installation of battery packs that have already undergone degradation as a result of usage. Further, battery packs span a wide range of capacities, ratings, and form factors for a wide array of vehicles. The diversity may increase as technologies for faster charging and newer battery chemistries emerge. This diversity is not only reflected in the second use packs for energy storage, but also in the charging of different vehicles within a station. However, during these periods of rapid change, markets may in part resist some standardization since improvements in battery performance provide benefits to producers able to incorporate new technologies when advances outweigh the benefits of standardization.

Similar trade-offs exist between standardization and incorporation of new technology with other power nodes.

In various implementations, systems may implement power converters to convert the power from at power node into the state used at the target port. In various implementations, full power processing (FPP) may include placing a power converter between the power node and the target port to convert the power at the power node to that of the target port. In some cases, a converter may be paired to each node in a group tied to a target port. The converter may process all of the power from the node.

In some cases, partial power processing (PPP) may be implemented. Although the number of converters may be dependent (e.g., equal or similar to) the number of power nodes, the PPP converters may process less than all of the power at the nodes. Instead, processing may be focused on a portion of the power to adjust the power from the power nodes the target state. In some cases, PPP may reduce the overall power processed. In some cases, PPP operations may increase efficiency relative to FPP because PPP (even with otherwise identical converters) does not process the full power of the system. Accordingly, per converter inefficiencies are reduced by the relative size of the portion being processes. For example, a FPP system processing 100% with 5% loss will lose 5% of the power of the system. A PPP configuration with the same converters processing 10% of the power, will lose 0.5%. Other efficiencies such as reduced internal heating may be gained.

For example, differential power processing (DPP) may operate to on the portion of the power that differs from the target state. In some cases, the power nodes may differ only on a given range (e.g., X % to Y %, where Y>X). Accordingly, power converter set, each individually capable of handling the maximum deviation of the range (e.g., Y %), may be sufficient to support power conversion. In some cases, the cost of a power converter may scale with the processing capacity of the converter. Accordingly, systems configured to employ PPP and/or DPP may have cost savings advantages over FPP systems. However, some FPP systems may operate where no information about current operation condition/future operational condition of power node is known. For example, DPP and PPP may have operational tolerance ranges where a particular target output may be delivered. If a set of power nodes falls outside the range (or for example degrades to the point it is outside the range after installation), the PPP system may fail.

In various scenarios, individual characterization of power nodes may be impractical and/or impossible. For example, where the characterization is time dependent characterization post installation may not necessarily be practical. For example, where full characterization may require a destructive/perturbative teardown, characterization would destroy or alter operation of the power node. Accordingly, the act of obtaining the characterization may render the characterization invalid. Hence, in some cases, individualized information on power nodes may not be available.

In some cases, statistical, empirical, and/or theoretical models may provide information of power node condition. For example, a model of battery degradation versus use and/or time may provide a distribution of states for a given second-use battery population. Accordingly, such a model may provide predictive information on a set of batteries drawn from such a population.

Therefore, a system capable of processing a set of power nodes with conditions estimated by a model may allow comparatively robust performance to blind and/or limited characterization implementations, while not requiring detailed characterization of individual power nodes in the set. Further, a system capable of making model-referenced corrections may allow for more uniform construction of power processing systems rather than relying on highly power-node-set-specific interconnects and power converter units.

In various implementations, a sparse set (e.g., a group, a tier (with a hierarchical relationship with another set of power converters), multiple hierarchical tiers within the set itself, or other configuration) of power converters may be selected to correct from a model-referenced estimates of power node variation for a set of power nodes. The sparse set may include a number of power converters that is dependent on the power node differences as estimated by the model. Thus, in some cases, the number of power converters in the sparse set may be fewer than the number of power nodes serviced by the power converters. As an illustrative example scenario, an example model may estimate that set of nine power nodes (selected by a population of power nodes governed by the model) may be (on-average) interconnected to three power converters for adjustment among the power nodes. In the illustrative example scenario, the three power converters may rebalance outputs/inputs from various ones of the power nodes to ensure a particular target power. In some cases, the three power converters may process input over a range to allow for uncertainty associated with choosing a finite number of power converters from the population. The distribution of a finite number of power converters selected from a population may not necessarily align with the distribution of the population as whole.

In some cases, the power nodes may be connected to the system and operate without individual characterization. The model may be the single node for estimating the condition of the power nodes. The nodes may be connected and assumed to operate within some tolerance of the model estimates.

In some cases, characterizations such as voltage level outputs, specifications for the power node when new, and/or other information that can be measured without alteration of the power node or costs rivalling the power processing system may be performed. In some cases, the processing system may include characterization elements such as voltage testing capabilities. In some cases, the characterization may be used for initialization, dynamic configuration, and/or other configuration of the system. Characterization may be used to facilitate interconnection of the power nodes that approximates the estimates (e.g., expected values) of power node differences provided by the model.

In some cases, correction from the model to a target output may occur in stages. In various implementations, the sparse set may be implemented as one or more sparse tiers, where power processing may proceed sequentially from tier-to-tier. In some cases, power processing at a sparse converter may occur after power conversion at one or more dense sets of power converters, and provide an adjustment that is earlier in series (by current flow) than other power conversion that may be done (e.g., for another power node connected later in a series). Accordingly, tiers may be, in some cases, defined by a localized order from (e.g., from dense to sparse) that may not necessarily align with a device-wide current flow.

In some cases, between the one or more sparse tiers and the power nodes, the system may include a dense set of power converters (which may include one or more dense tiers). In some cases, dense tiers may be used to correct for uncertainty from deviation of individual power nodes to model estimates. For example, a specific installed group of batteries (power nodes) may have a second-use battery that degraded less than expected and other that have degraded more than expected. In addition, the status of all of these batteries may continue to change over time during this second-use installation. A dense set of power converters may adjust the power from the batteries to more closely match the distribution that would be predicted by the model. Then, a sparse set of power converters may correct from the model distribution to the target output. In some cases, the dense set may include a number of power converters that is proportional to the total number of power nodes (for example, equal to, one less than, or other number directly dependent on the number of power nodes).

In various implementations, the deviation of individual batteries from the model estimates may be (on average) smaller in magnitude than the correction from the model to the target output. Accordingly, the processing capacity of power converters in the dense set may be smaller than that of those in the sparse set. In some cases, the cost of a power converter may scale with power processing capacity. Hence, in various implementations, a hierarchical system with a dense set of power converters and a sparse set of power converters may have more power converters than a PPP system (as discussed above). The number of power converters in the dense set would be similar to the total number of power converters in the PPP system. However, in some cases, the processing capacity of the individual ones of dense set of converters may be smaller than the individual power converters of the PPP system. For example, the capacity of the individual power converters of the PPP system may be more similar to the power processing capacity of the sparse set of converters. Accordingly, despite having more power converters, the hierarchical system may still be lower cost than a similarly performing PPP system (which is already lower cost than similarly performing FPP system).

Figure 2:
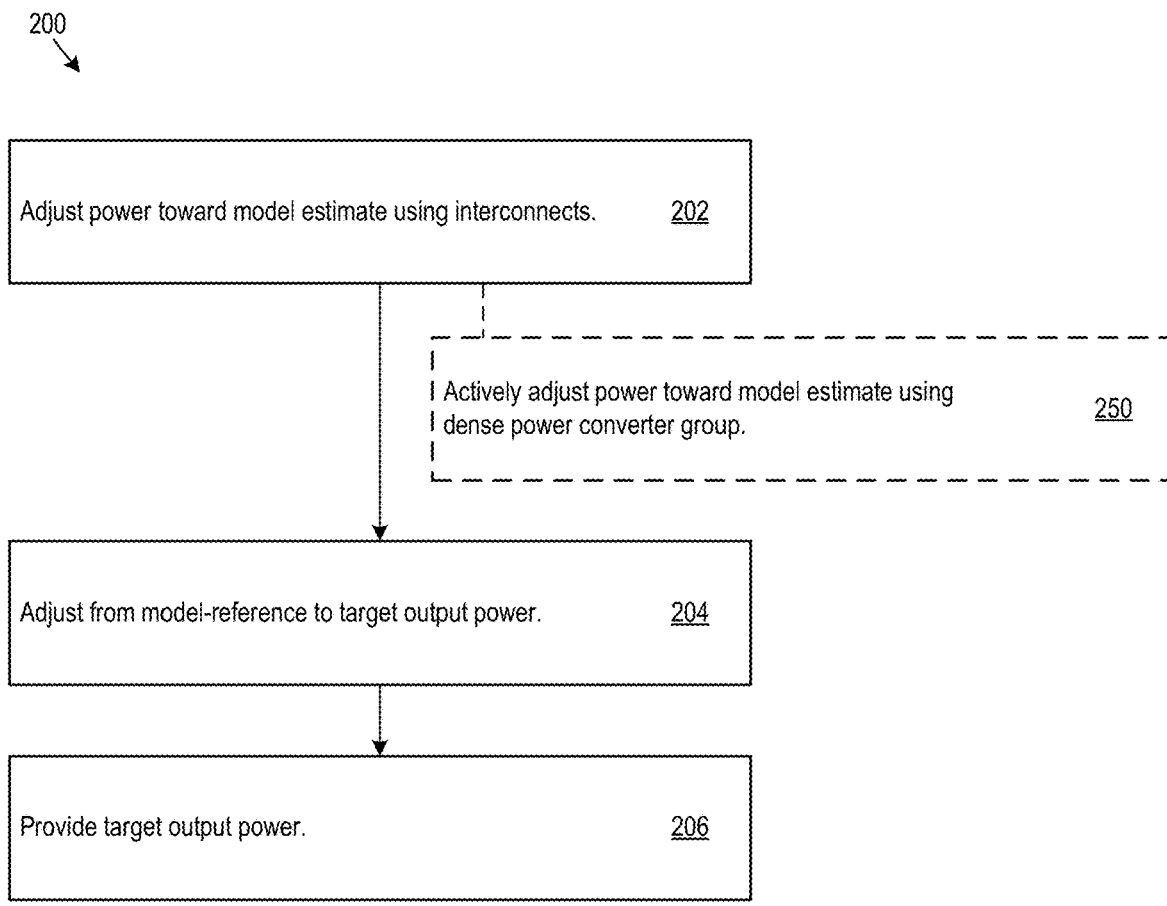
FIG. 2 shows example power conversion device logic.

Referring now to FIG. 1, an example power conversion device (PCD) 100 is shown. Reference is also made to FIG. 2, which shows PCD logic 200, which may govern the operation of the PCD 100. The example PCD 100 includes multiple power nodes 111-119. Various ones the power nodes divided into multiple subsets different power provision capacities. The example power nodes are selected from a population of power nodes with provision capacities estimated using the model 120. The PCD 100 further includes interconnects 130 between the multiple power nodes 111-119 and a sparse set of power converters 140, 142, 144. The sparse set works to adjust power at different points to ensure a final target power at the port 150.

The multiple subsets may be characterized by a difference in their power provision. The subsets may include one or more power converters each. In some cases, the number of power nodes in each subset may be different. In some cases, different subsets may include the same number of power converters. The model 120, by virtue of modeling the population from which the power nodes are selected, may provide an estimate (e.g., an expect value) of the differences between the subjects and/or estimates of the number of power converters in the subset. For example, the population power nodes may include a population of second-use batteries. The model 120 may include data, algorithms, distributions, machine-learning inputs, and/or estimation tools for predicting the condition of a pre-determined finite number of batteries from a population of second-use batteries. In some cases (e.g., where multiple different types of power nodes are used in a single PCD 100) the model may include models for multiple different populations from which the power nodes may be selected. For example, the power nodes may include a mix of solar cells and second-use batteries. In such an illustrative example scenario, the model 120 may include estimates for battery degradation and/or estimates for solar cell degradation (and/or other battery and solar cell models). In an example, the power nodes may include a mix of battery chargers and a climate control system for a building. Models for battery charging and/or seasonal power use variation may be used.

In some cases, model 120 complexity may be addressed via algorithms such as machine learning algorithms (e.g., neural networks, support vector machines, k-means analysis, and/or other machine learning algorithms). For example, estimation of power node degradation trajectories and/or current powers node state estimation may be modeled using neural networks trained to perform estimates based on limited non-destructive-characterization input information such as power node age, current average operating temperature, performance metrics at manufacture, serial number, current voltage production level, or other non-destructive-characterization input information. In some cases, the machine learning models may be trained using various destructive and non-destructive characterization information to allow for inference of more invasive characterization metrics for a power node even when only non-destructive characterization information or other limited-set information is available. In various cases, the machine-learning models may (additionally or alternatively) be used to synthesize information from multiple nodes and/or multiple type of information.

The machine learning algorithms may further output interconnect configuration recommendations for the selected set of power nodes to be used in the PCD 100.

The interconnects may include connections (e.g., parallel, series, capacitive, inductive, power converting, and/or other interconnects) to adjust the power provided by the power nodes (either actively or passive) toward the estimate of the states of the power nodes provided by the model 120 (202). Accordingly, the interconnects may not necessarily be connected one-to-one with power nodes. For example, multiple series connected nodes may be used to estimate a desired operating voltage before connection to a power converter. Accordingly, the power at the multiple connected nodes may be processed by a single converter. In some cases, for simplicity of analysis and/or presentation a complex electrical system may be referred to, depicted as, or reduced (via circuit equivalents) to a single node. The interconnects may include switches to support reconfiguration of the connections over time. The switches may allow the power converter—power source connections to be changed after initial setup, for example, as a result of non-uniform degradation among the power sources.

In various implementations, the interconnects 130 may include non-converting interconnects such a parallel or serial connections that may be dynamically, manually, or statically configured to adjust the power sources 111-119 (e.g., actually selected and installed power sources) toward the provision estimates provided by the model.

In some implementations, the interconnects 130 may include a set of dense power converters 131-139 to actively adjust (e.g., with partial power processing of the model-deviation power) the power sources 111-119 toward the provision estimates provided by the model (250). The model-deviation power may include the portion of the power that deviates from the estimates provided by the model 120. The dense set of power converters may be connected in one or more tiers (which are be below the sparse set 140, 142, 144 within the hierarchy). The total number of tiers in the power converter hierarchy may include the number of tiers of dense set power converters added to the number of tiers of sparse set of power converters. In single-tier implementations, only single tier of sparse power conversion may be used by the example PCD 100. Such single-tier implementations may not necessarily include any dense set of power converters.

In various implementations, the sparse set 140, 142, 144 may be fed by the interconnects 130 (and the dense set of power converters (if present)). The sparse set may provide partial power processing (204) to adjust the power from model-referenced estimates (e.g., which are approximated by the adjustment via the interconnects 130) to ensure the target output power at the output 150 (206). In other words, the sparse set of power converters provides partial power processing of the power (e.g., with taps as various points within the PCD) to obtain the power format used by the system being powered by the power sources.

Example Model Analysis PCD

Figure 9:
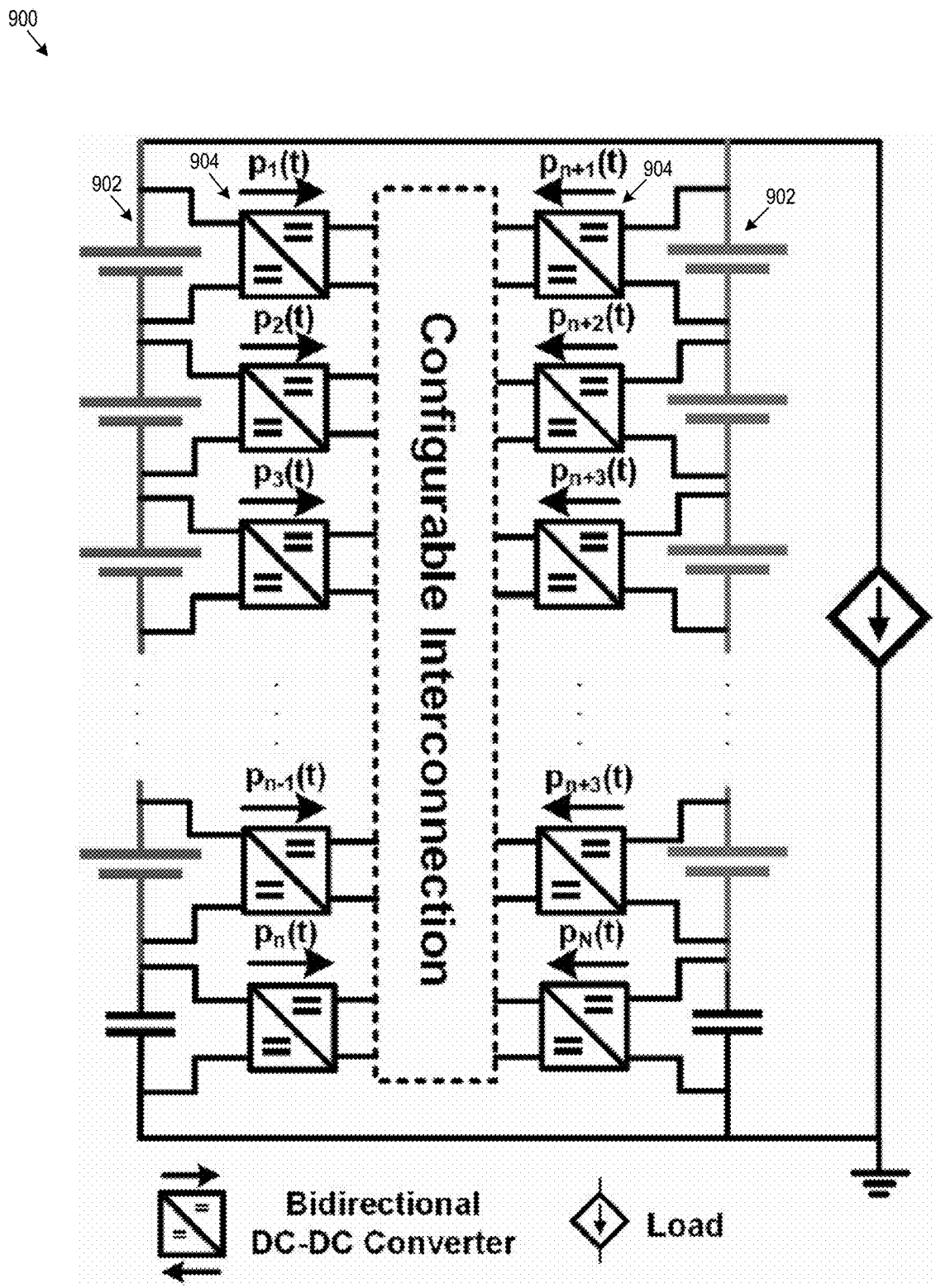
FIG. 9 shows an example model power conversion device for power conversion efficiency analysis.

FIG. 9 shows an example model PCD 900 for power conversion efficiency analysis. The example model PCD 900 includes M power nodes 902 and N power converters 904. In various implementations, the interconnection configuration and power processed by the N power converters 904 may be formulated as a two-dimensional array of processed power:

$$P_{pro} \triangleq [|p_1(t)|, |p_2(t)|, \ldots, |p_N(t)|] \quad \text{Eq. 1}$$

Where is $P_{pro}$ is the total power processed and $p_x$ is the power processed by individual power converters. For a feasible set of interconnections $\mathbb{J}$, controls $\mathbb{K}$, power node constraints $\mathbb{B}$, and converter constraints $\mathbb{C}$, a constrained problem may be stated as:

$$\lambda_1 \|P_{pro}\|_1 + \lambda_2 \|P_{pro}\|_\infty + \lambda_3 \|P_{pro}^T J_{T,1}\|_0 \quad \text{Eq. 2}$$

Where coefficients, $\lambda_1$, $\lambda_2$, $\lambda_3$, are weighting factors. The term $\lambda_1 \|P_{pro}\|_1$, is included in the constrained problem because it reduces aggregate power processed by the converters and effects thermal management cost. The term $\lambda_2 \|P_{pro}\|_\infty$, reduces the peak (e.g., maximum or other peak) power processed the power converters This term may govern converter processing capacity. The term $\lambda_3 \|P_{pro}^T J_{T,1}\|_0$, reduces the number of power converters used. The weighting factors, $\lambda_1$, $\lambda_2$, $\lambda_3$, may allow for balance between average processing load, converter peak capacity, and number of converters.

Example Implementations

The example implementations below are included as illustrations of the general techniques and architectures discussed above. The any of the features or any grouping of the features discussed with regard to the example implementations may be present or absent in other implementations.

Figure 3:
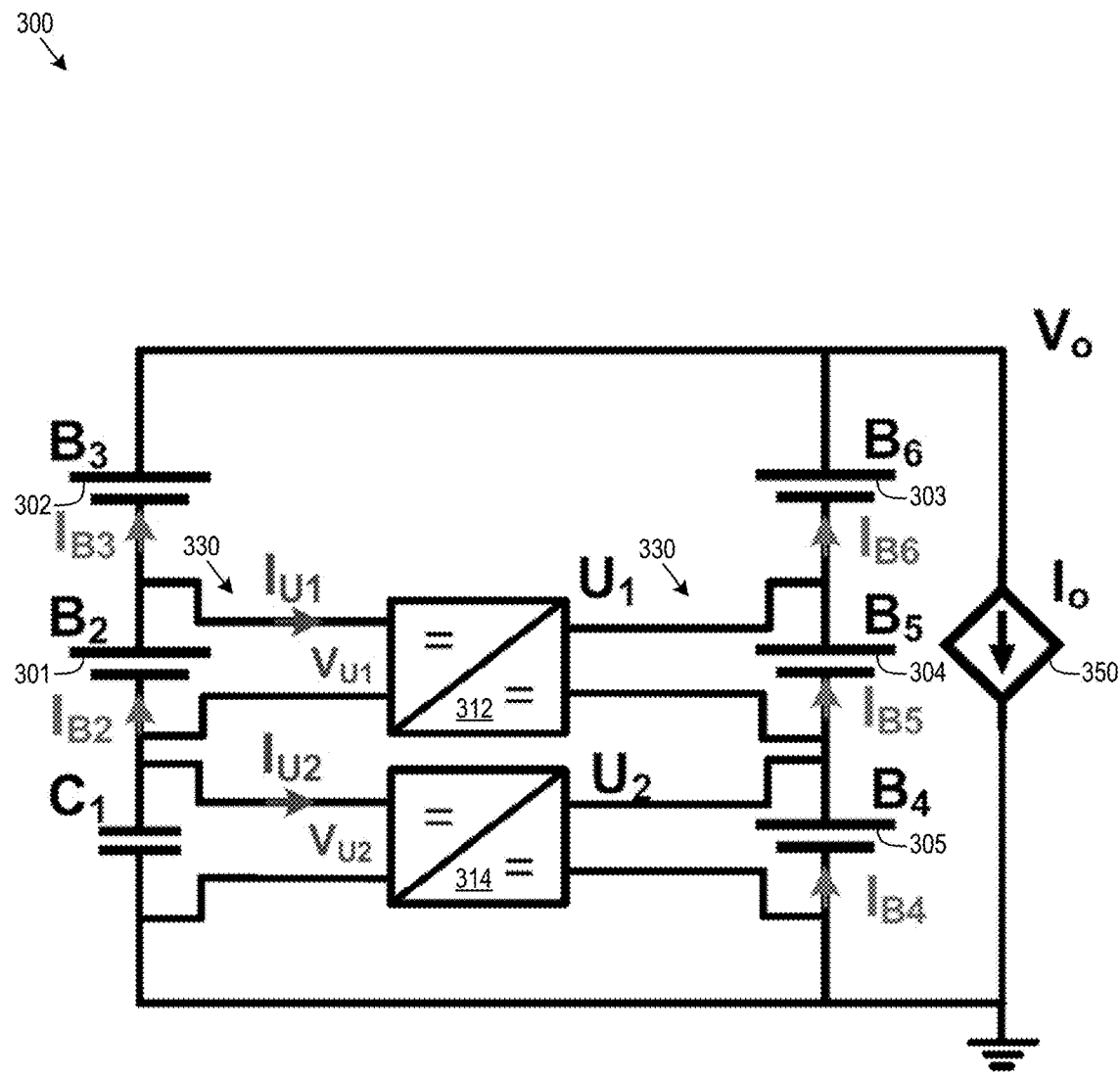
FIG. 3 shows an illustrative example power conversion device.

FIG. 3 shows an illustrative example PCD 300. The example PCD 300 includes five power nodes 301-305, two sparse power converters 312, 314. The five power converters are connected in two parallel lines of serially connected nodes. In the example PCD 300, the interconnects 330 connect the sparse power converters 312, 314 to the power nodes. The adjustments 340 provided by the power converters ensure that the target output power is provided to the output load 350.

As an illustrative scenario for optimization, the example metrics are defined for the PCD 300, as shown in Table 1.

TABLE 1

Illustrative Example Scenario PCD Metrics $V_o$ = 1 power unit (pu) (Load Voltage)
$I_o$ = 1 pu (Load Current)
$V_{B3} = V_{B4} = V_{B5} = \frac{1}{3}$ pu
$V_{B1} = V_{B2} = 0.45$ pu TABLE 1-continued Illustrative Example Scenario PCD Metrics $V_{C1}$ = 0.1 pu
$V_s$ = 0.5 pu (Maximum Voltage Stress of Power Converter)
$I_s$ = 0.4 pu (Maximum Current Stress of Power Converter)
Maximum current stress of power nodes: $[I_{B1}, I_{B2}, I_{B3}, I_{B4}, I_{B5}]$ = [0.5, 0.6, 0.4, 1.3, 0.5] pu The optimization may aim to minimize (or otherwise reduce), the processed power, for the parameters $I_{u1}$ and $I_{u2}$:

$$\min P_p^i = |I_{U_1} V_{U_1}| + |I_{U_2} V_{U_2}| \quad \text{Eq. 3}$$

The constraints may include linear programming to balance in current inputs/outputs, stress limits, and/or current limits defined for the power nodes.

Figure 4:
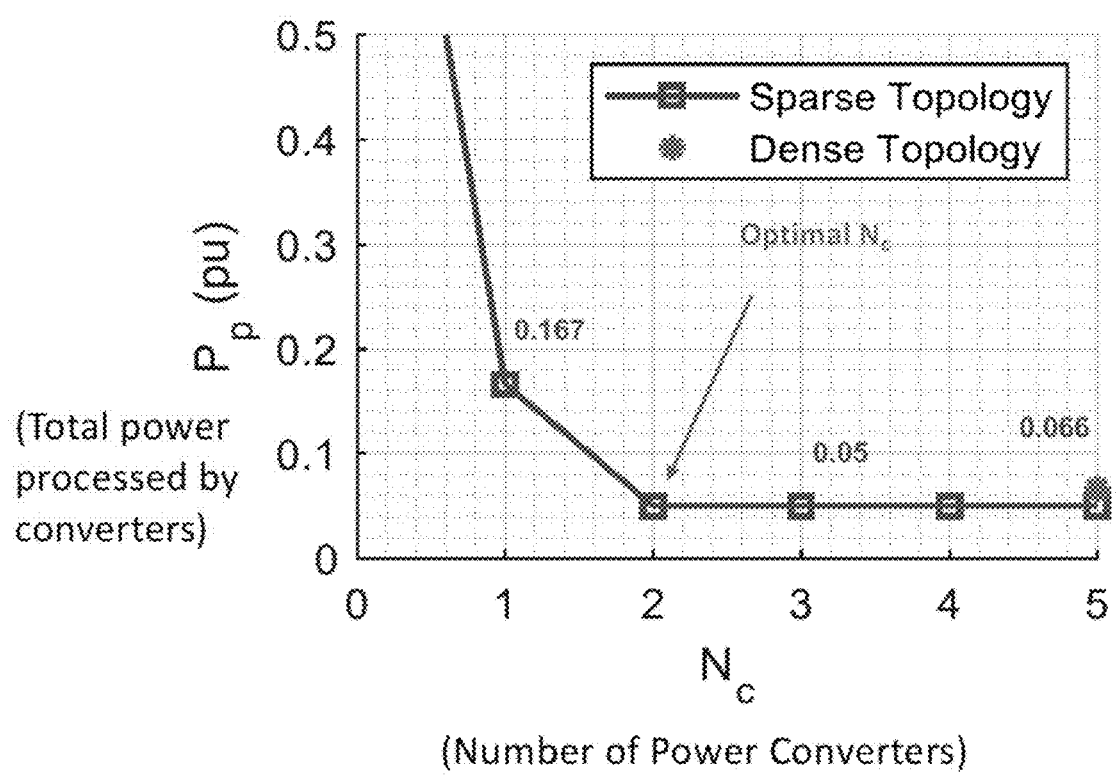
FIG. 4 shows an example plot of power converter use and power processed for dense and sparse versions of the example power conversion device of FIG. 3.

FIG. 4 shows an example plot 400 of power converter use and power processed for dense and sparse versions of the example PCD 300. Despite using fewer power converters, the example sparse version processes 25% less power for the given battery set.

Figure 5:
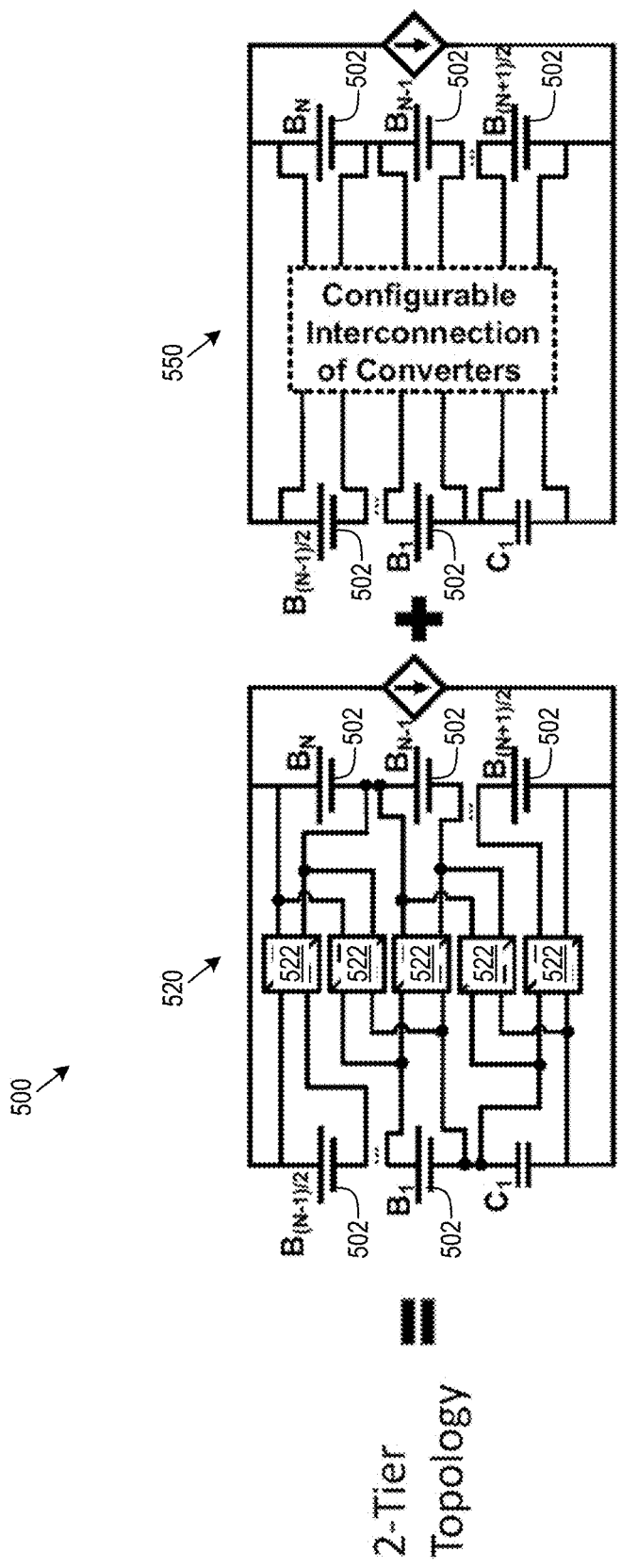
FIG. 5 shows an example multiple-tier power conversion device.

FIG. 5 shows an example multiple tier PCD 500. The multiple tier PCD 500 includes a first dense tier 520 of dense power converters 522 coupled to the power nodes 502. The number of dense power converters may be determine based on the number (N) of power nodes. The PCD 500 also includes a second sparse tier 550 with configurable interconnections to the power nodes. The sparse tier 550 may operate after the dense tier 520 in the power conversion hierarchy. The points of interconnect for the sparse tier may be determined based on the model for the power converter heterogeneity and/or based on characterization of the power nodes at the time of install (or other non-destructive characterizations).

Figure 6:
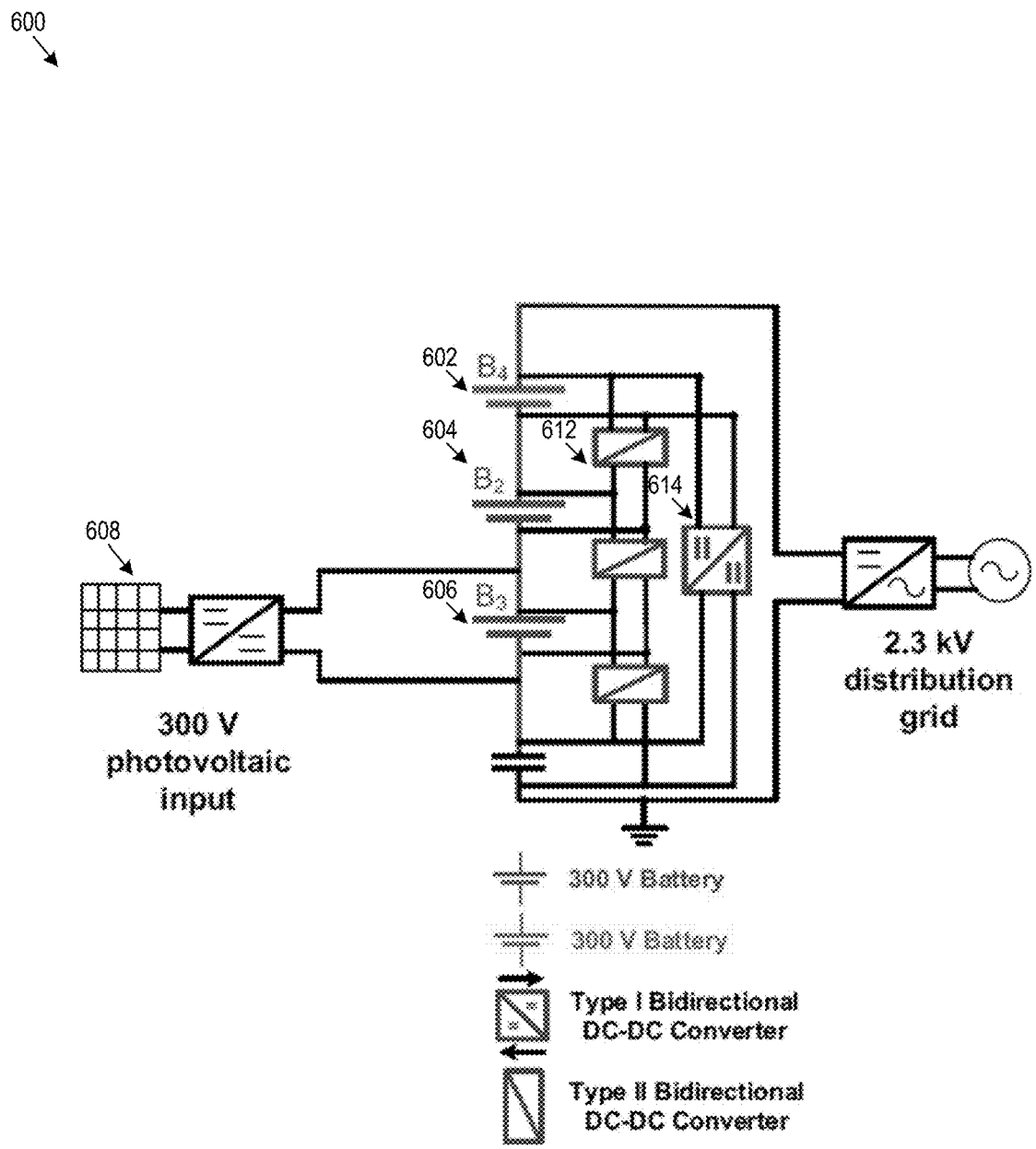
FIG. 6 shows an example diverse power node power conversion device.

FIG. 6 shows an example diverse power node PCD 600. In the example diverse power node PCD 600, the power nodes include batteries 602, 604, 606, and a photovoltaic cell array 608. The power nodes are coupled to two tiers 612, 614 of power converters.

Figure 7:
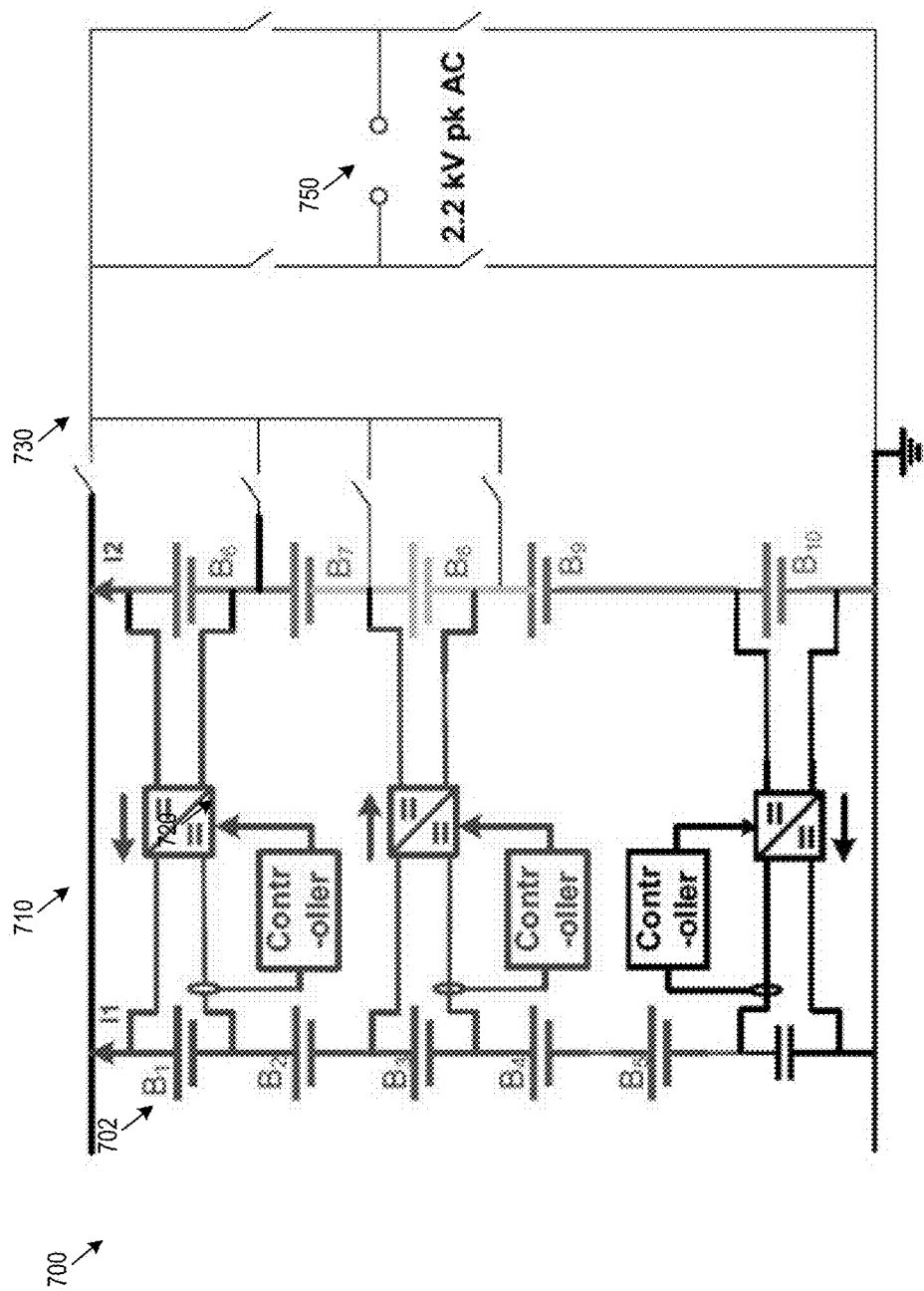
FIG. 7 shows an example power conversion device with direct current (DC) sources integrated into an example alternating current (AC) system.

FIG. 7 shows an example PCD 710 with direct current (DC) nodes 702 integrated into an example alternating current (AC) system 700. The PCD 710 includes a sparse set 720 of power converters. The PCD 710 is connected via switching interconnects 730 to an AC load 750.

Figure 8:
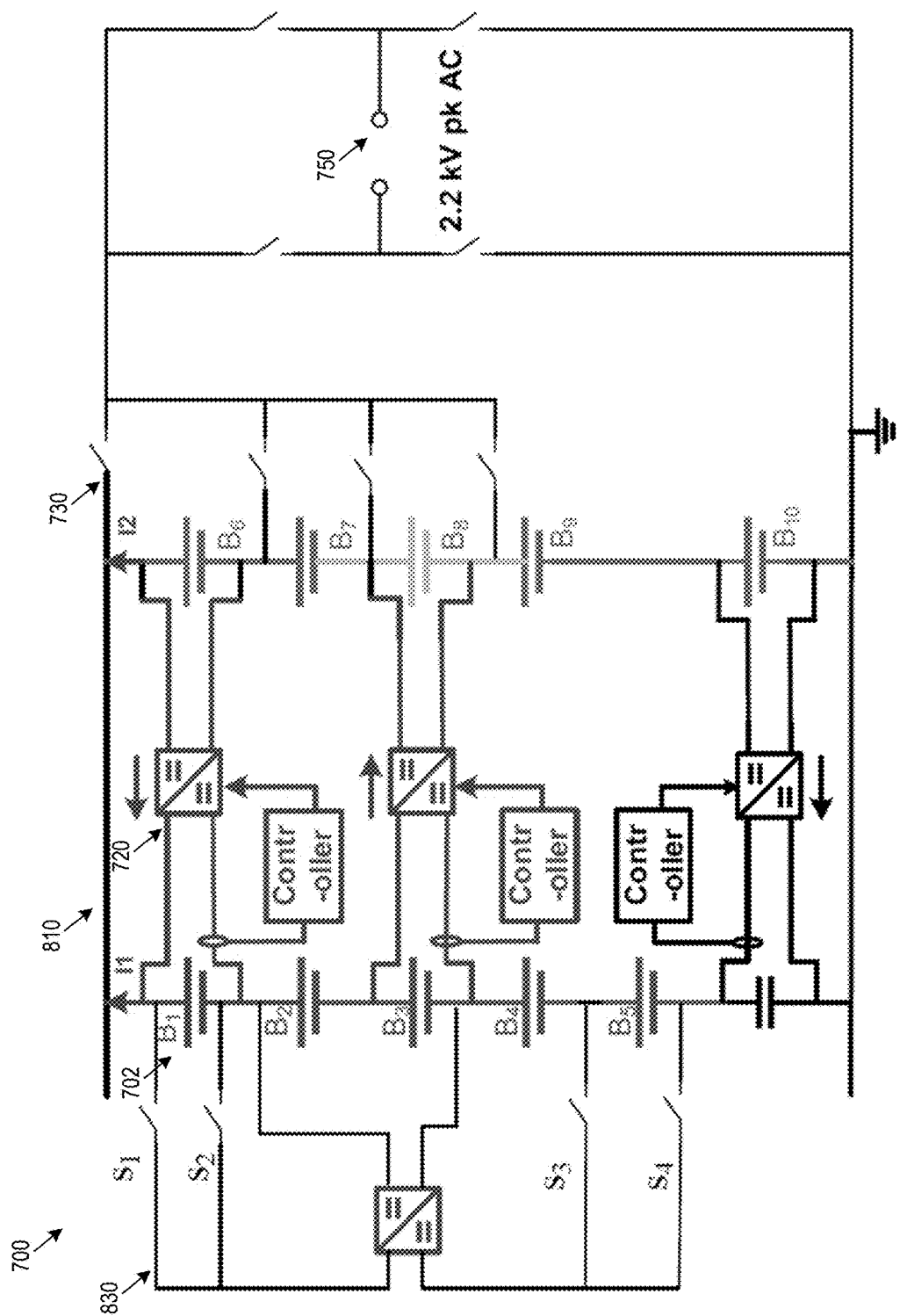
FIG. 8 shows the example AC system of FIG. 7 with a dynamically switched power conversion device.

FIG. 8 shows the example alternating current (AC) system 700 with a dynamically switched PCD 810. The dynamically-switched PCD 810 may include a switching system 830 to allow for the alteration of power node-power converter interconnects.

Figure 10:
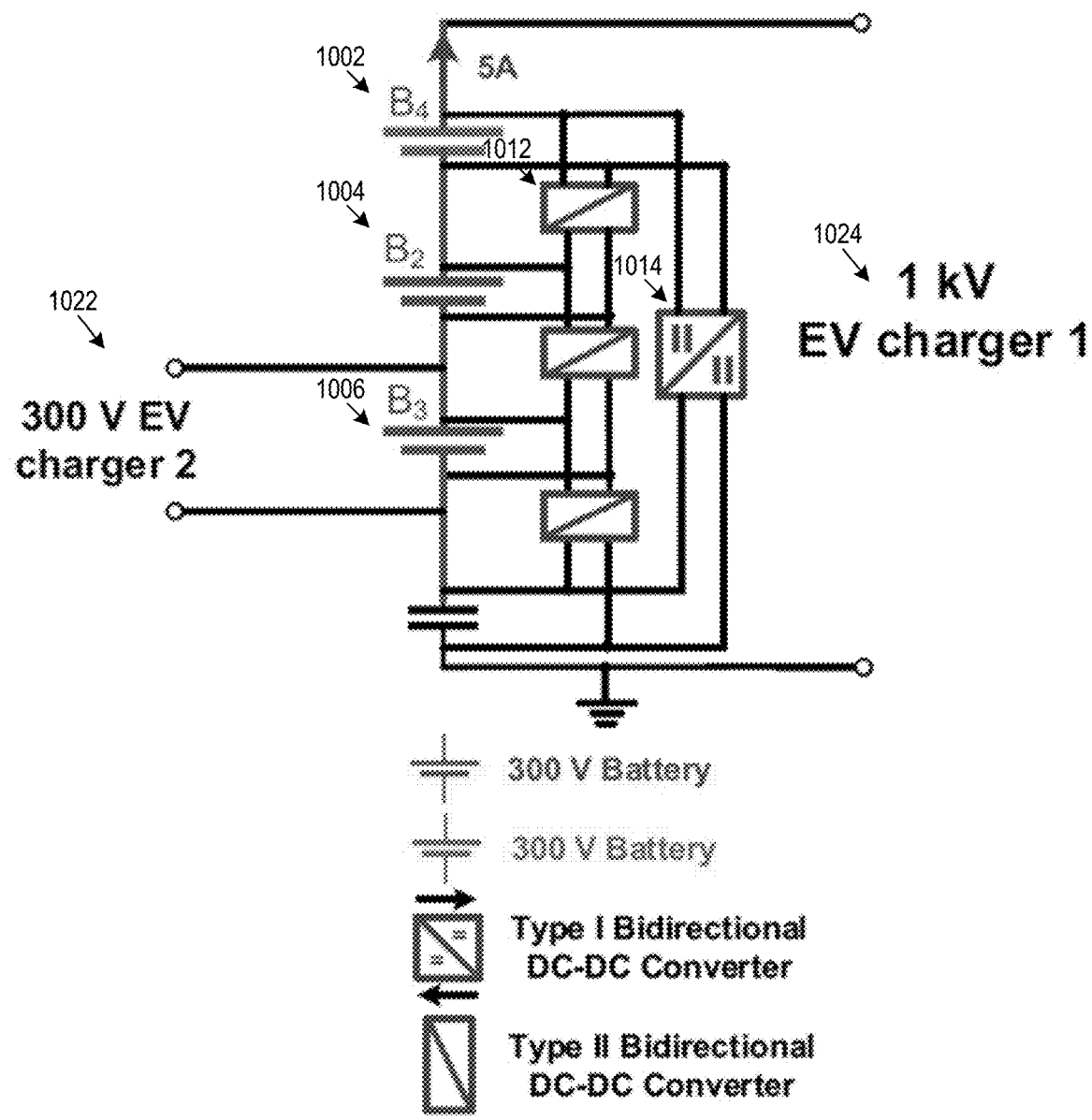
FIG. 10 shows an example diverse power node power conversion device.

FIG. 10 shows an example diverse power node PCD 1000. In the example diverse power node PCD 600, the power nodes include batteries 1002, 1004, 1006, and battery chargers 1022, 1024. The power nodes are coupled to two tiers 1012, 1014 of power converters.

Various example implementations have been included for illustration. Other implementations are possible.

TABLE 2

Examples

E1. A device including:
multiple power sources including:
    a first subset each with a first power output; and
    a second subset each with a second power output characterized by a difference from the first power output;
a dense tier of power converters coupled to the multiple power sources, a first number of power converters in the dense tier being proportional to a total number of the multiple power sources; and
a sparse tier of power converters coupled to the multiple power sources through the dense tier, a second number of power converters in the sparse tier dependent on a model for estimating the difference.

TABLE 2-continued

Examples

E2. The device of example E1 or any other example in this table, where:
each of the multiple power sources is characterized by a different power output; and
the first and second subsets each include a respective single power source of the multiple power sources.
E3. The device of example E1, where the multiple power sources:
optionally, include batteries and/or power sinks;
optionally, the power sources include DC sources; and
optionally, the device includes an AC power output.
E4. The device of example E3 or any other example in this table, where the model for estimating the difference includes a model of battery degradation.
E5. The device of example E1 or any other example in this table, where the device further includes one or more additional tiers of power converters coupled to the multiple power sources via the dense tier of power converters and the sparse tier of power converters.
E6. The device of example E1 or any other example in this table, where the dense tier of power converters includes interconnects to the multiple power sources, the interconnects arranged in accord with the model for estimating the difference.
E7. The device of example E6 or any other example in this table, where the interconnects include dynamically reconfigurable interconnects.
E8. The device of example E1 or any other example in this table, where the first number of
power converters is equal to or one less than the total number.
E9. The device of example E8 or any other example in this table, where the second number of power converters is less than the first number of power of converters.
E10. The device of example E1 or any other example in this table, where the dense tier of power converters includes interconnects to the multiple power sources, the interconnects forming a group including a first power source from the first subset and a second power source from the second subset to a first power converter of the dense tier of power converters.
E11. The device of example E10 or any other example in this table, where the first power converter is configured to partially process power from the first and second power sources.
E12. The device of example E11 or any other example in this table, where the first power converter is configured to partially process power from the first and second power sources by processing a differential power, the differential power including a portion of power from the group that results at least in part in deviation from a target output for the device.
E13. The device of example E11 or any other example in this table, where the first power converter is configured to partially process power from the first and second power sources by processing a model-deviation power, the model-deviation power including a portion of power from the group that results at least in part in deviation from a predicted output for the group based on the model.
E14. A method including:
for multiple power sources including:
    a first subset each with a first power output; and
    a second subset each with a second power output characterized by a difference from the first power output;
executing a first stage of power processing at a dense tier of power converters coupled to the multiple power sources, a first number of power converters in the dense tier being proportional to a total number of the multiple power sources; and
executing a second stage of power processing at a sparse tier of power converters coupled to the multiple power sources through the dense tier, a second number of power converters in the sparse tier dependent on a model for estimating the difference.
E15. The method of example E14 or any other example in this table, where executing the first stage of power processing at the dense tier includes using sets defined by interconnects between the multiple power sources and the dense tier.
E16. The method of example E15 or any other example in this table, further including selecting the sets according to:
an initial characterization of the multiple power sources; and
a fit to the model.
E17. The method of example E14 or any other example in this table, where executing the first and second stages of power processing include partially processing power from the multiple power sources.
E18. A device including:
multiple power sources including:
    a first subset each with a first power output; and
    a second subset each with a second power output characterized by a difference from the first power output;
interconnects between the first and second subsets, the interconnects distributed to correct from the difference toward an estimate from a model for estimating the difference; and
a sparse tier of power converters, a number of power converters in the sparse tier selected to correct from the estimate to a target power output; and
an output coupled to the sparse tier, the output configured to supply the target power output.
E19. The device of example 18 or any other example in this table, where the device is configured for single-tier power converter operation.
E20. The device of example 18 or any other example in this table, further including a dense tier of power converters between the interconnects and the sparse tier.

TABLE 2-continued

Examples

E21. A device including:
power sources;
power converters; and
interconnects, where the device includes any feature or any combination of features in the examples in the disclosure.
E22. A method including performing model-referenced power conversion in accord with any feature or any combination of features in the examples in the disclosure, where:
optionally, the model-referenced power conversion includes multiple tiers of power conversion;
optionally, the model that is referenced includes a machine learning model, such as a neural network; and
optionally, the model-referenced power conversion includes optimization of a power conversion device via configuration, assemble, or other process.
E23. A device to support execution of the method of example E22 or any portion thereof, where:
optionally, the device includes a power conversion device to perform power conversion; and
optionally, the device includes a computational device to support execution of the model, e.g., including a processor, memory, stored instructions, a display, a user interface, and/or other components to support computation control and execution.
E24. A device including:
multiple power nodes including:
    a first subset each with a first operational power; and
    a second subset each with a second operational power characterized by a difference from the first operational power;
interconnects between the first and second subsets, the interconnects distributed to correct from the difference toward an estimate from a model for estimating the difference; and
a sparse set of power converters, a number of power converters in the sparse set selected to correct from the estimate to a target power; and
a port coupled to the sparse set, the port configured to operate at the target power.
E25. The device of example E24 or any other example in this table, where the sparse set is configured for single-tier power converter operation.
E26. The device of example E24 or any other example in this table, where the interconnects include a dense tier of power converters.
E28. The device of example E24 or any other example in this table, where the multiple power nodes include multiple power sinks.
E29. The device of example E28 or any other example in this table, where the multiple power nodes include multiple power sources interconnected with the multiple power sinks.
E30. The device of example E28 or any other example in this table, where the multiple power sinks include at least two different battery chargers each with a different charging power.
E40. The device of example E28, where the difference in operational power accounts for a difference in operating voltage, a difference power storage capacity, a difference in node temperature, or other difference managed via power processing.
E41. The device of example E28, where an individual node of the multiple power nodes includes multiple power sources or sinks interconnected, e.g., in series, parallel, or other configuration.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device including:
multiple power sources including:
  a first subset each with a first power output; and
  a second subset each with a second power output characterized by a difference from the first power output;
a dense tier of power converters coupled to the multiple power sources, a first number of power converters in the dense tier being proportional to a total number of the multiple power sources; and
a sparse tier of power converters coupled to the multiple power sources through the dense tier, a second number of power converters in the sparse tier dependent on a model for estimating the difference.

2. The device of claim 1, where:
each of the multiple power sources is characterized by a different power output; and
the first and second subsets each include a respective single power source of the multiple power sources.

3. The device of claim 1, where:
the multiple power sources include direct current (DC) power sources; and
an output of the device includes an alternating current (AC) output.

4. The device of claim 1, where:
the multiple power sources include batteries; and
the model for estimating the difference includes a model of battery degradation.

5. The device of claim 1, where the device further includes one or more additional tiers of power converters coupled to the multiple power sources via the dense tier of power converters and the sparse tier of power converters.

6. The device of claim 1, where the dense tier of power converters includes interconnects to the multiple power sources, the interconnects arranged in accord with the model for estimating the difference.

7. The device of claim 6, where the interconnects include dynamically reconfigurable interconnects.

8. The device of claim 1, where the first number of power converters is equal to or one less than the total number.

9. The device of claim 8, where the second number of power converters is less than the first number of power of converters.

10. The device of claim 1, where the dense tier of power converters includes interconnects to the multiple power sources, the interconnects forming a group including a first power source from the first subset and a second power source from the second subset to a first power converter of the dense tier of power converters.

11. The device of claim 10, where the first power converter is configured to partially process power from the first and second power sources.

12. The device of claim 11, where the first power converter is configured to partially process power from the first and second power sources by processing a differential power, the differential power including a portion of power from the group that results at least in part in deviation from a target output for the device.

13. The device of claim 11, where the first power converter is configured to partially process power from the first and second power sources by processing a model-deviation power, the model-deviation power including a portion of power from the group that results at least in part in deviation from a predicted output for the group based on the model.

14. A method including:
for multiple power sources including:
a first subset each with a first power output; and
a second subset each with a second power output characterized by a difference from the first power output;
executing a first stage of power processing at a dense tier of power converters coupled to the multiple power sources, a first number of power converters in the dense tier being proportional to a total number of the multiple power sources; and
executing a second stage of power processing at a sparse tier of power converters coupled to the multiple power sources through the dense tier, a second number of power converters in the sparse tier dependent on a model for estimating the difference.

15. The method of claim 14, where executing the first stage of power processing at the dense tier includes using groups defined by interconnects between the multiple power sources and the dense tier.

16. The method of claim 15, further including selecting the groups according to:
an initial characterization of the multiple power sources; and
a fit to the model.

17. The method of claim 14, where executing the first and second stages of power processing include partially processing power from the multiple power sources.

18. A device including:
multiple power nodes including:
a first subset each with a first power level; and
a second subset each with a second power level characterized by a difference from the first power level;
a dense tier of power converters coupled to the multiple power nodes, a first number of power converters in the dense tier being proportional to a total number of the multiple power nodes; and
a sparse tier of power converters coupled to the multiple power nodes through the dense tier, a second number of power converters in the sparse tier dependent on a model for estimating the difference.

19. The device of claim 18, where:
each of the multiple power nodes is characterized by a different power level; and
the first and second subsets each include a respective single power node of the multiple power nodes.

20. The device of claim 18, where the device further includes one or more additional tiers of power converters coupled to the multiple power nodes via the dense tier of power converters and the sparse tier of power converters.

* * * * *